United States Patent

Tsuge

[11] 4,319,781
[45] Mar. 16, 1982

[54] BICYCLE SEAT COVER

[76] Inventor: Kenji Tsuge, 1-3-16, Higashi Kaigan, Tsuijido, Fujisawa-Shi, Kanagawa-Ken, Japan

[21] Appl. No.: 167,831

[22] Filed: Jul. 14, 1980

[51] Int. Cl.³ .............................................. B62J 1/00
[52] U.S. Cl. ..................................... 297/214; 297/219
[58] Field of Search ....................... 297/195, 214, 219

[56] References Cited

U.S. PATENT DOCUMENTS

| | | | |
|---|---|---|---|
| 1,322,959 | 11/1919 | Sawasaki | 297/214 |
| 1,991,751 | 2/1935 | Kennedy | 297/214 |
| 2,314,046 | 3/1943 | Kalter | 297/214 X |
| 3,807,793 | 4/1974 | Jacobs | 297/214 |
| 3,836,196 | 9/1974 | Hu | 297/219 |
| 3,997,214 | 12/1976 | Jacobs | 297/214 |
| 4,012,072 | 3/1977 | Hansen | 297/214 X |
| 4,103,966 | 8/1978 | Allen | 297/214 X |

Primary Examiner—Roy D. Frazier
Assistant Examiner—Peter A. Aschenbrenner
Attorney, Agent, or Firm—Edward A. Sokolski

[57] ABSTRACT

A bicycle seat cover with which friction on the bicyclist is minimized. This end result is achieved by providing the cover with a compliant central portion which may be fabricated of a polyurethan foam, this central portion having a middle layer thereover of a low friction material, such as a polyethylene, and finally an outer layer over the polyethylene layer which is of soft material and which has an inner surface of low friction material, such as an acrylic resin coating, and an outer surface of a soft material, such as a suitable nylon. The outer cover fits over the bicycle seat and has an elastic ring-shaped band on the bottom portions thereof which grips the cover to the bicycle seat.

9 Claims, 6 Drawing Figures

BICYCLE SEAT COVER

This invention relates to bicycle seat covers, and more particularly to such a cover which provides minimal frictional wear against the portions of the bicyclist's clothing and body parts which come in contact therewith.

With most bicycle seats, the bicycle rider experiences a good deal of frictional movement between his legs and other body parts which come in contact therewith which not only is quite discomforting to the rider but also tends to produce heavy wear on clothing. In order to alleviate this problem, a number of bicycle seat covers have been developed in the prior art. These prior art devices are described in U.S. Pat. No. 4,012,072, issued Mar. 15, 1977, to Hansen; U.S. Pat. No. 3,807,793, issued Apr. 30, 1974, to Jacobs; U.S. Pat. No. 1,322,959, issued Nov. 25, 1919, to Sawasaki; and U.S. Pat. No. 3,997,214, issued Dec. 14, 1976, to Jacobs. The Jacobs patents describe a bicycle seat having a plurality of compartments formed therein to ensure that the material within each compartment will not squeeze or creep to other areas when subjected to stress, this being claimed to reduce the friction encountered by the rider. This construction appears to be somewhat expensive in form and is integrated into the bicycle seat itself. It is therefore not suitable for covering an existing bicycle seat, as is the device of the present invention, and rather requires complete replacement of the seat. Both Sawasaki and Hansen describe covers which can be placed on existing bicycle seats. Sawasaki describes such a cover for reducing wear on the clothes of the rider which employs a filler or padding which provides a cushioning effect. Hansen, on the other hand, describes a cover having a plurality of longitudinally disposed grooved and raised portions which provide an accordian-like movement with the up and down movements of the rider's legs to minimize friction. In neither of these prior art covers is there any sliding motion permitted between the outer layer of the bicycle seat cover and inner layers thereof so as to permit movement of the contacting body portions of the rider along with the outer layer relative to the seat as in the present invention.

The device of the present invention provides a substantial improvement over the prior art in that it affords sliding motion between an outer layer of the seat cover and an inner layer thereof, the outer layer adhering to the rider's contacting body parts such that relative movement and friction between the rider's body and the seat are minimized. This end result is achieved in the device of the present invention in a highly economical construction which can easily be fitted on any existing bicycle seat and which operates in a highly effective manner to achieve the desired end results.

It is therefore an object of this invention to minimize the friction between a bicycle rider and a bicycle seat, thereby to lessen wear on the rider's clothing and alleviate discomfort often experienced in bicycle riding.

It is a further object of this invention to provide a highly economical bicycle seat cover which minimizes friction between the bicycle rider's clothing and body parts and the seat.

Other objects of this invention will become apparent as the description proceeds in connection with the accompanying drawings of which:

Figure 1:
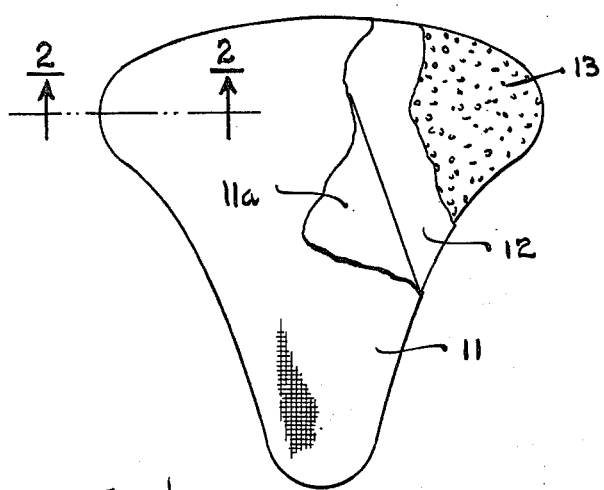
FIG. 1 is a top plan view of a first embodiment of the invention.
Figure 2:
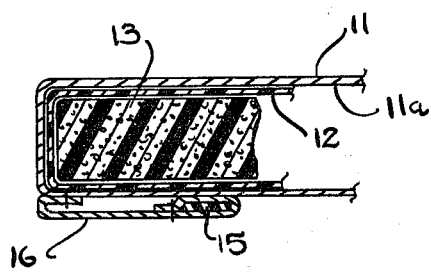
FIG. 2 is a cross-sectional view taken along the plane indicated by 2—2 in FIG. 1.

Referring now to FIGS. 1 and 2, a first embodiment of the invention is illustrated. The cover of the invention has an outer layer portion 11 which is fabricated of a soft material such as a suitable nylon. This outer layer completely surrounds an inner layer 12 of a low friction material, such as a suitable polyethylene film. Inner surface 11a of outer layer 11 is preferably coated with a low friction material which may be sprayed thereon and which may be a suitable low friction polymer, such as acrylic resin. Such an inner coating on the outer layer substantially reduces the friction. In addition, an acrylic resin coating works as a water-proofing agent. Finally, at the center or core of the seat cover is a soft, resilient pad 13 which may be of polyurethane foam.

Attached to the bottom peripheral edges of outer cover 11 is an annular flap member 16 which extends inwardly and which has an elastic annular band 15 running around its inner end. This flap portion is used to fit the seat cover over the bicycle seat and to retain it in position.

It should be immediately apparent that the parts of the bicyclist's clothing and body parts which contact the outer surface of outer covering 11 will tend to adhere to this surface in view of the fact that the friction between the outer surface of the outer layer and the rider's clothing is higher than that between the inner surface of covering 11 and the outer surface of layer 12. At the same time, in view of the low friction between the inner surface of covering 11 and the outer surface of layer 12, sliding motion will occur between these two interfacing surfaces with movement of the clothing and body parts of the rider which come into contact with the seat cover. Thus, friction between such clothing and body parts and the seat cover is minimized with resultant minimal clothing wear and an alleviation of frictional discomfort to the rider.

Figure 3:
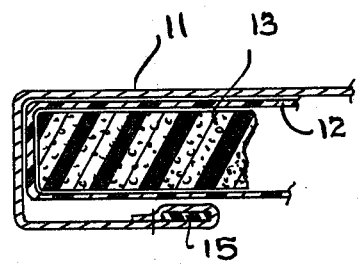
FIG. 3 is a cross-sectional view of a second embodiment of the invention.

Referring now to FIG. 3, a second embodiment of the invention is illustrated. This embodiment is similar to the first-described embodiment except for the elimination of flap portion 16. In this embodiment, outer cover 11 terminates in its lower portions with annular elastic band 15 such that the lower outer surface of film layer 12 is in direct contact with the bicycle seat. Otherwise, this second embodiment is the same as the first. This second embodiment has the advantage of economy of construction as compared with the first.

Figure 4:
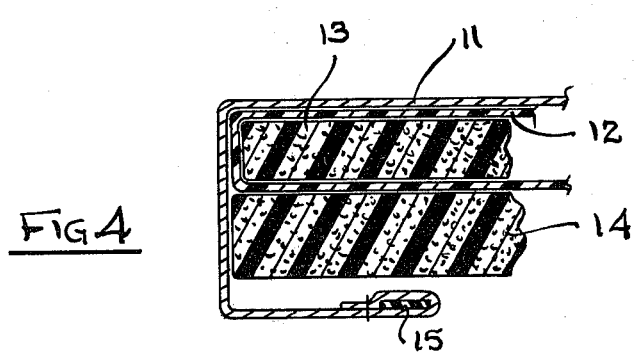
FIG. 4 is a cross-sectional view illustrating the second embodiment of the invention installed on a bicycle seat.

Referring now to FIG. 4, the second embodiment of the invention is illustrated in its installed position on a bicycle seat 14. As can be seen, the elastic band 15 retains the cover in position on the seat, yet permits slidable movement between the interfacing surfaces of layers 11 and 12.

Figure 5:
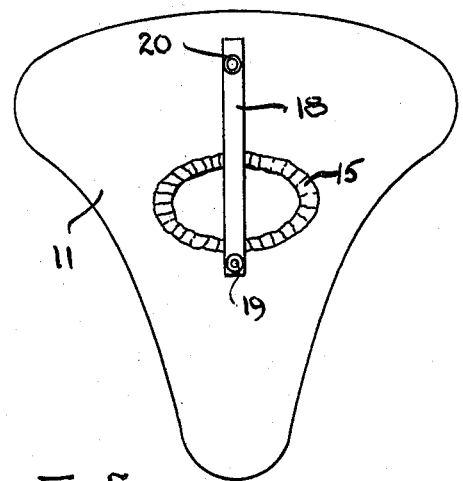
FIG. 5 is a bottom plan view of a third embodiment of the invention having a strap incorporated therein for holding the cover in a folded configuration.
Figure 6:
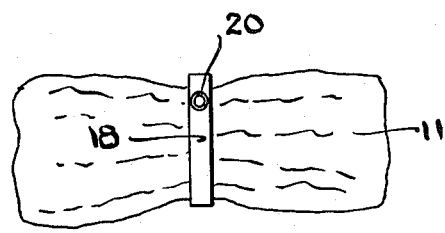
FIG. 6 is a bottom plan view of the third embodiment shown in its folded condition.

Referring now to FIGS. 5 and 6, a third embodiment of the invention is shown. This third embodiment may be similar to either of the first two embodiments but incorporates a strap 18 which may be of elastic material for retaining the cover in its folded condition. As can be seen, one end of the strap is attached to the outer layer 11 and has the male member 19 of a snap connector attached thereto. At the other end of the strap is the female member 20 of the snap connector such that when the cover is folded up, as shown in FIG. 6, the strap can be wound around the folded cover and the snap connector used to snap the ends of the strap together to hold the cover in its folded condition for carrying in the user's pocket. Thus, when the cover is not in use, it can be carried by the user, thereby avoiding its becoming wet or soiled.

While the invention has been described and illustrated in detail, it is clearly to be understood that this is intended by way of illustration and example only, and is not to be taken by way of limitation, the spirit and scope of this invention being limited only by the terms of the following claims.

I claim:

1. A bicycle seat cover comprising
   an inner central portion of a compliant material,
   a middle layer covering at least the top surface of said central portion, said middle layer being of a material having a low friction outer surface, and
   an outer layer covering at least the top surface of said middle layer having an outer surface of substantially higher friction than the inner surface thereof such that the clothing and body portions contacting said outer layer will tend to frictionally engage the outer surface thereof with slidable motion being permitted between the outer and middle layers.

2. The bicycle seat cover of claim 1 wherein the middle layer completely surrounds the central portion and has low friction inner and outer surfaces throughout.

3. The bicycle seat cover of claim 1 and further including means for removably retaining said seat cover on a bicycle seat.

4. The bicycle seat cover of claim 3 wherein said retaining means comprises an annular elastic band attached to the bottom edge of said outer layer.

5. The bicycle seat cover of claim 2 wherein said retaining means comprises an annular flap extending inwardly from the bottom side edges of said outer layer, and an annular elastic band attached to the inner edges of said flap.

6. The seat cover of claim 1 wherein the inner surfaces of said outer layer are coated with a low friction material.

7. The seat cover of claims 1, 2, 3 or 6 wherein the middle layer is of at least one thin sheet of polyethylene.

8. The cover of claims 1, 2 or 3 and further including strap means attached at one end thereof to the cover for retaining the cover in a folded-up condition.

9. The cover of claim 8 wherein the strap means comprises a strap having mating snap connectors on the opposite ends thereof.

* * * * *